United States Patent
Ipse et al.

(10) Patent No.: US 11,415,115 B2
(45) Date of Patent: Aug. 16, 2022

(54) SOLAR RECEIVER FOR RECEIVING SOLAR RAYS AND FOR HEATING A MEDIUM

(71) Applicant: Kaefer Isoliertechnik GmbH & Co. KG, Bremen (DE)

(72) Inventors: Daniel Ipse, Weyhe (DE); Andreas Wilhelm Pöppinghaus, Buchholz i.d. Nordheide (DE)

(73) Assignee: KAEFER ISOLIERTECHNIK GMBH & CO. KG, Bremen (DE)

( * ) Notice: Subject to any disclaimer, the term of this patent is extended or adjusted under 35 U.S.C. 154(b) by 0 days.

(21) Appl. No.: 16/956,796

(22) PCT Filed: Oct. 25, 2018

(86) PCT No.: PCT/EP2018/079237
§ 371 (c)(1),
(2) Date: Aug. 27, 2020

(87) PCT Pub. No.: WO2019/120704
PCT Pub. Date: Jun. 27, 2019

(65) Prior Publication Data
US 2020/0392947 A1  Dec. 17, 2020

(30) Foreign Application Priority Data

Dec. 22, 2017 (DE) .................... 10 2017 223 756.2

(51) Int. Cl.
*F03G 6/04* (2006.01)
*F24S 23/77* (2018.01)
(Continued)

(52) U.S. Cl.
CPC ............... *F03G 6/04* (2013.01); *F24S 23/77* (2018.05); *F24S 40/55* (2018.05); *F03G 6/063* (2021.08); *F24S 2080/05* (2018.05)

(58) Field of Classification Search
CPC .. F24S 60/00; F24S 20/20; F24S 23/77; F24S 40/55; F24S 2080/05
See application file for complete search history.

(56) References Cited

U.S. PATENT DOCUMENTS 5,421,322 A * 6/1995 Karni .................... B01J 19/122
126/681
5,931,158 A * 8/1999 Buck ..................... F24S 20/20
126/648
(Continued)

FOREIGN PATENT DOCUMENTS

DE  30 42 557 A1  5/1982
DE  19713598 A1  10/1998
(Continued)

OTHER PUBLICATIONS

WO 01/61254A1 English Translation (Year: 2001).*
EP 1610073A3 English Translation (Year: 2005).*
DE102006056070B4 (Year: 2006).*

*Primary Examiner* — Shafiq Mian
(74) *Attorney, Agent, or Firm* — McGlew and Tuttle, P.C.

(57) ABSTRACT

A solar receiver includes a hollow body, which has a longitudinal axis (8.4), a wall (8) surrounding the longitudinal axis (8.4), an opening (9) disposed in the wall (8) for the entry of heat rays, and an end region opposite the opening (9). The wall (8) includes an outer wall (8.1), an inner wall (8.2), and a partition wall (8.3) disposed therebetween. The outer wall (8.1) and the partition wall (8.3) enclose an outer annular space (8.1.1). The inner wall (8.2) and the partition wall (8.3) enclose an inner annular space (8.2.1). The outer annular space (8.1.1) has, in the end region, an inlet (12) for a free-flowing medium. The two annular spaces (8.1.1, 8.2.1) are conductively connected to (Continued)

one another in the region of the opening (9), and the inner annular space (8.2.1) has an outlet (11) for a free-flowing medium in the end region.

9 Claims, 5 Drawing Sheets

(51) Int. Cl.
    *F24S 40/55*     (2018.01)
    *F24S 80/00*     (2018.01)
    *F03G 6/06*     (2006.01)

(56) References Cited

U.S. PATENT DOCUMENTS

| | | | |
|---|---|---|---|
| 8,353,286 B2 * | 1/2013 | Li | F24S 60/30 126/643 |
| 8,978,642 B2 * | 3/2015 | Stettenheim | F24S 70/225 126/684 |
| 9,869,302 B2 * | 1/2018 | Hischier | F03G 6/065 |
| 2002/0083946 A1 * | 7/2002 | Karni | F24S 10/80 126/648 |
| 2006/0174866 A1 | 8/2006 | Zhang | |
| 2013/0298557 A1 * | 11/2013 | Treece | F24S 10/40 60/641.15 |

FOREIGN PATENT DOCUMENTS

| | | | | |
|---|---|---|---|---|
| DE | 10200403191 A1 | | 1/2006 | |
| DE | 102006056070 B4 * | | 6/2018 | G02B 5/08 |
| EP | 1610073 A2 * | | 12/2005 | F24S 40/50 |
| EP | 2 871 359 B1 | | 5/2015 | |
| WO | 01/61254 A1 | | 8/2001 | |
| WO | WO-0161254 A1 * | | 8/2001 | F24S 20/20 |
| WO | 01/96791 A1 | | 12/2001 | |
| WO | WO-0196791 A1 * | | 12/2001 | F24S 20/20 |
| WO | 2010/076347 A2 | | 7/2010 | |
| WO | 2012/076347 A2 | | 6/2012 | |

* cited by examiner

SOLAR RECEIVER FOR RECEIVING SOLAR RAYS AND FOR HEATING A MEDIUM

CROSS REFERENCE TO RELATED APPLICATIONS

This application is a United States National Phase Application of International Application PCT/EP2018/079237, filed Oct. 25, 2018, and claims the benefit of priority under 35 U.S.C. § 119 of German Application 10 2017 223 756.2, filed Dec. 22, 2017, the entire contents of which are incorporated herein by reference.

TECHNICAL FIELD

The present invention pertains to a solar power plant and especially to a solar receiver of such a power plant. Solar energy is collected and bundled here in a collector array. The energy is then irradiated into one or more solar receivers.

TECHNICAL BACKGROUND

Such solar receivers are described in numerous documents. Reference is made to WO 2012/076347 A2 and EP 2 871 359 B1 as examples.

Solar power plants of this type have higher efficiencies than photovoltaic plants and are of great economic interest for this reason alone. However, the operating and maintenance costs as well as the investment costs are relatively high. Attempts are therefore made to increase the energy efficiency in order thus to achieve higher end temperatures through a higher yield of the energy supply with a solar power plant of a given size.

The solar receiver is a decisive component of a solar power plant of the design mentioned. Air, i.e., air from the surrounding area or air from a compressor, is heated here.

SUMMARY

The basic object of the present invention is to configure a solar receiver for receiving solar rays, which heat a free-flowing medium, such that the efficiency of the solar receiver is increased. The partial objects to be accomplished to this end are the following:

Increasing the temperature to be achieved of the medium to be heated, reduction of the investment costs, avoiding so-called hot spots, and saving the cost of materials.

The mentioned principal object as well as the partial objects are accomplished by means of a solar receiver according to the present invention.

The solar receiver according to the present invention accordingly comprises the following features:

The wall of the solar receiver comprises an outer wall, an inner wall as well as a partition wall located between the these two.

The outer wall and the partition wall enclose an outer annular space, and the inner wall and the partition wall enclose an inner annular space, The outer annular space has an inlet for free-flowing medium at an end of the hollow body, which forms the solar receiver; the two annular spaces are in conductive connection with one another in the area of the opening; the outer annular space has an inlet for free-flowing medium in the end area located opposite the opening; the two annular spaces are in conductive connection with one another in the area of the opening, and the inner annular space has an outlet for free-flowing medium in the end area.

Thus, an essential feature of the present invention is that the solar receiver is formed from a hollow body, which comprises a wall formed from three individual walls, namely, a wall formed from an outer wall, a partition wall and an inner wall, and an outer annular space and an inner annular space are formed. The cold air to be heated flows at an end of the hollow body into the outer annular space and flows through this to the other end; the flow makes a turn here, leaving the outer annular space and flowing into the inner annular space and it also flows, in turn, through this to the first-named end. A first flow takes place in the wall in the outer annular space in a first direction, and a flow takes place in the opposite direction in the second annular space.

The partition wall between the outer annular space and the inner annular space may be heat-insulated, so that the two annular spaces are thermally separated from one another. Air is used, in general, as the free-flowing medium. The air is heated on its way through the inner annular space, using for this purpose the solar energy that is irradiated into the opening of the solar receiver.

The inner annular space is advantageously provided with fluid-carrying and/or turbulence-generating elements. The fluid-carrying elements may be, for example, walls, which pass helically through the inner annular space. They carry the entering stream over a helical path through the inner annular space from the inlet to the outlet of said annular space. The helical path runs along the inner circumference of the wall. The solar energy present in the interior space of the solar body is thus transferred to the medium in an optimal manner.

The turbulence-generating elements may be projections, such as pins or bumps, but also depressions. Turbulence of the flowing medium leads to an improved heat transfer.

One embodiment of special interest of guide elements comprises the provision of these guide elements with a sawtooth profile.

The sawtooth profile thus passes through the inner annular space. The diameter of this annular space may be, for example, 500 mm to 600 mm, and its length may be, for example, 800 mm to 1,000 mm. The guide element may also be configured such that a plurality of threads are formed. Each air stream thus travels over a path of equal length over the circumference of the inner annular space. The individual air streams therefore have the same temperature at the outlet from the inner annular space.

The configuration according to the present invention of the wall with an inner annular space and with an outer annular space follows the principle of the reversed pressure tank, analogously to a submarine. Therefore, reinforcement of the jacket surface is only necessary on the outside. The outer annular space and the inner annular space are largely uncoupled from one another thermally, so that a markedly thinner insulating wall is necessary on the outer side of the solar receiver based on the lower surface temperature prevailing there. The insulation is therefore relatively simple. It is not necessary to use special ceramics as an insulation.

The swirling of the air, brought about by the sawtooth profile and by the air flowing in, has the following favorable effects on the heat transfer:

Longer residence time due to an extension of the flow path compared to a laminar flow/rinsing.

Enlargement of the heat exchange surface due to the profile geometry and the surface configuration.

The heat is distributed uniformly over the outer jacket surface of the inner annular space. This leads to a reduction of so-called hot spots (=locally limited surface heating due to focusing from the collector array due to time-dependent fluctuations in the energy). The mechanical stresses are therefore minimized by the present invention. There are no hot spots developing for other reasons. Thus, there are no punctiform increases in thermal stresses, either.

Both the inner annular space and the outer annular space may have flow cross sections that are constant when viewed over the flow path of the air. However, it is also conceivable to configure and arrange the walls, i.e., the outer wall, the inner wall and the partition wall, such that the flow cross section increases or decreases over the flow path. The pressure in the annular spaces can thus be influenced.

Based on the configuration according to the present invention of a solar receiver, commercially available high-temperature steels made of cast steel can be processed. No special materials are needed due to the lower temperatures and hence due to the avoidance of peak temperatures as well as due to the elimination of hot spots.

A plasma coating with ceramic materials is sufficient as a surface coating. Such a coating is only necessary on the inner side of the inner annular space. Standard components as they are known from the manufacture of pipelines and boilers can be used.

The release of hot air at the end of the inner annular space shall take place with the lowest possible heat losses. An inner insulation of the inner annular space can be recommended here, analogously to "single-dome" gas turbines and the combustion chamber principle.

The following advantages are specifically achieved by the present invention:
Temperatures of the free-flowing medium—air, gas— from 700° C. to 800° C. are reached. —Standard components can be used due to increased conductance and better heat transfer of the dual flow of the free-flowing medium in opposite directions.
The fluid-carrying and/or turbulence-generating elements are of substantial advantage for the efficiency of the solar receiver.
The flow pressure is relatively low and it leads to a better and more complete heat transfer of the energy present in the interior space of the solar receiver and in the inner annular space.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
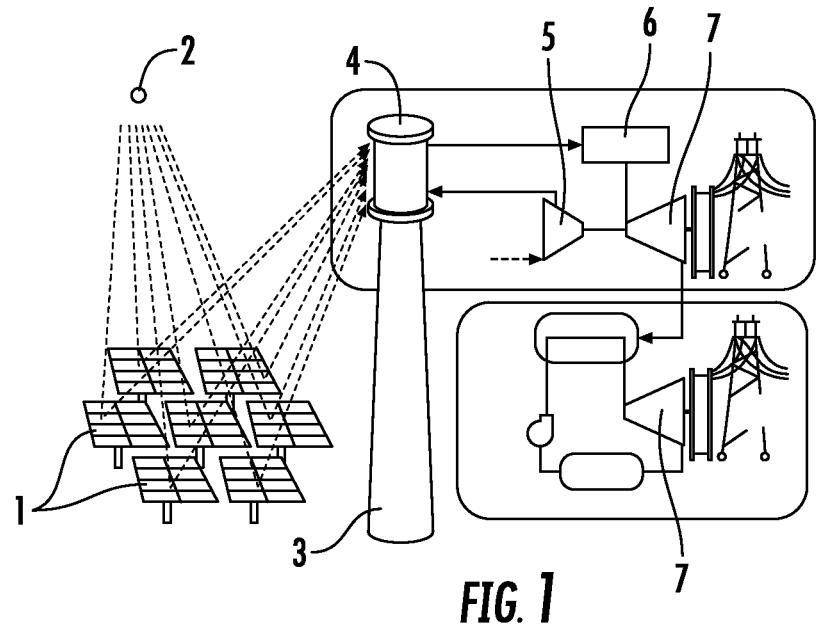
FIG. 1 is a schematic view of a solar power plant according to the state of the art for generating electrical current.

The solar power plant shown in FIG. 1 illustrates the direct feed of concentrated solar energy to a gas turbine. A heliostat field 1 is seen. This receives solar rays from the sun 2. A tower 3 carries at its top end at least one solar receiver 4. The energy irradiated into the solar receiver heats air, which is highly compressed by a compressor 5.

The heated air is fed to a topping combustor 6, and from there to a gas turbine 7. The further process steps are not essential for the present invention. The so-called Brayton-Rankine cycle is applied here.

Figure 2:
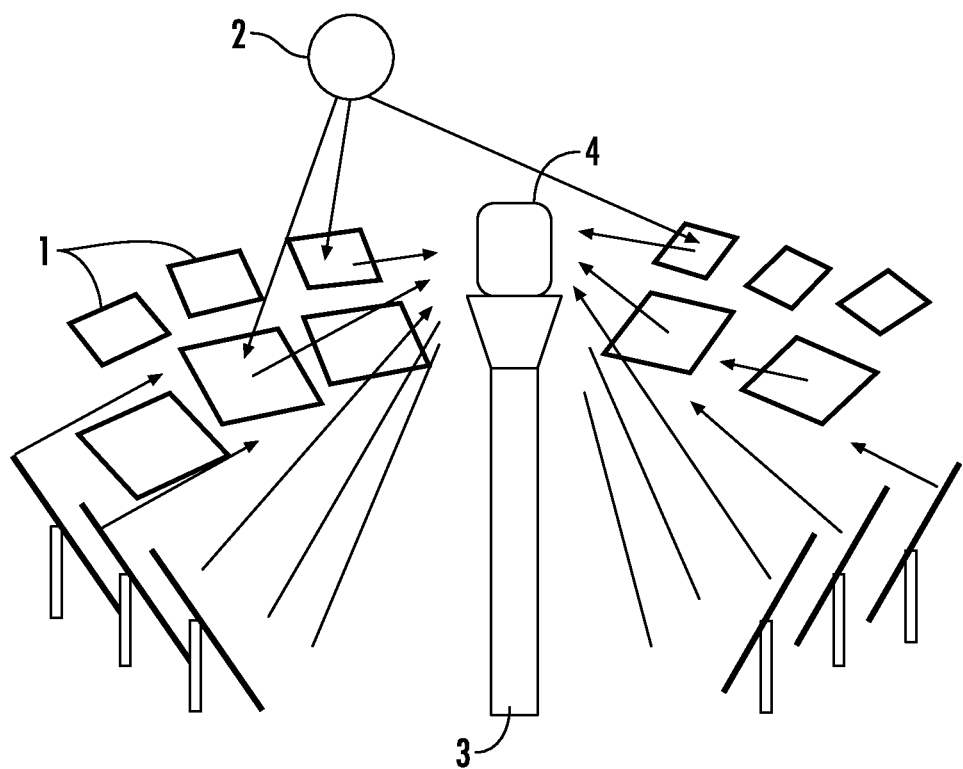
FIG. 2 is a schematic view of a solar power plant according to the state of the art, in which the solar receiver may, however, be configured according to the present invention.

A heliostat field, irradiated by the sun 2, is again provided in the power plant shown schematically in FIG. 2. A tower 3 carries at least one solar receiver 4. This may be configured according to the present invention and is shown in the following FIGS. 3 through 7.

Figure 3:
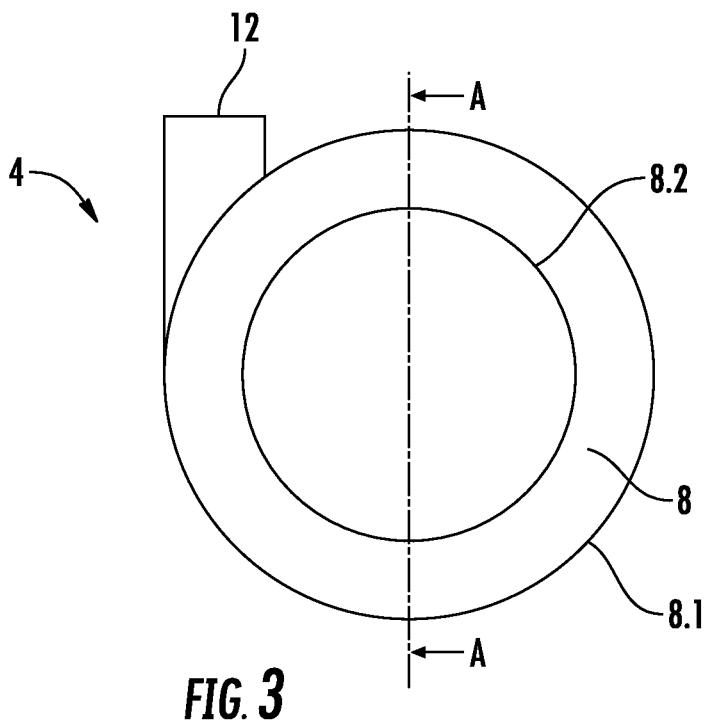
FIG. 3 is a top view of an end area of a cylindrical solar receiver.
Figure 4:
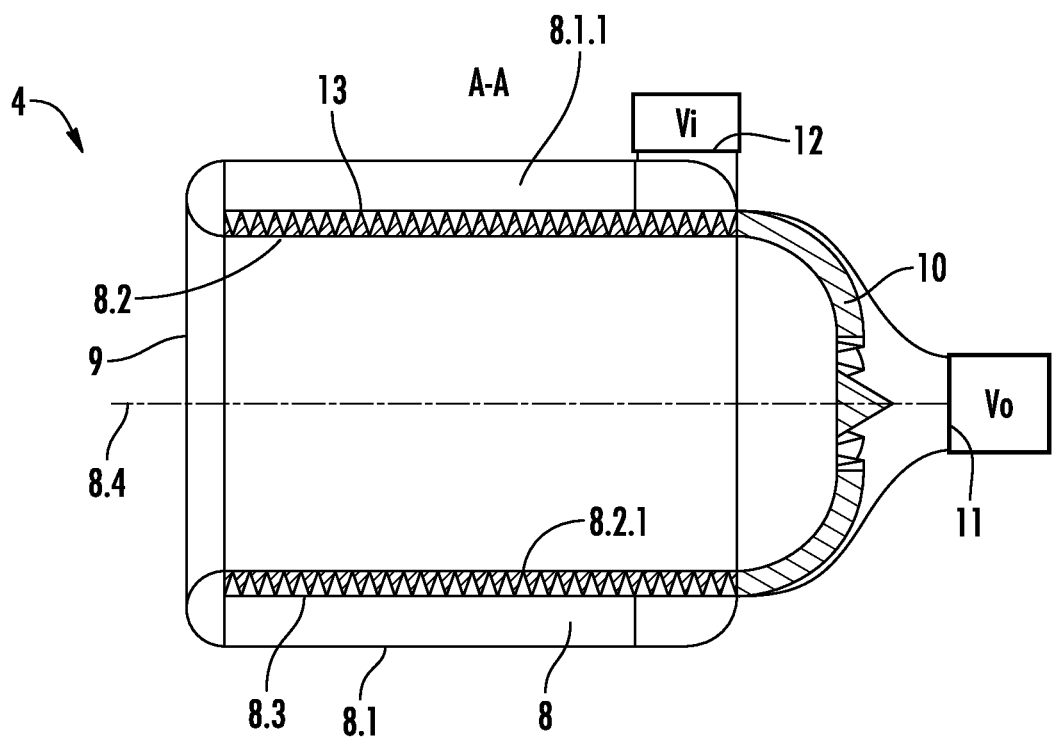
FIG. 4 is an axial sectional view of the solar receiver according to section line A-A of FIG. 3.

The solar receiver 4 shown in FIGS. 3 and 4 is a hollow body of a cylindrical shape. It has a wall 8. The wall comprises an outer wall 8.1, an inner wall 8.2 and a partition wall 8.3. The partition wall is located between the outer wall 8.1 and the inner wall 8.2. The outer wall 8.1 and the partition wall 8.3 enclose between them an outer annular space 8.1.1, while the inner wall 8.2 and the partition wall 8.3 enclose an inner annular space 8.2.1 between them. The wall 8 has a longitudinal axis 8.4.

The solar receiver 4 is arranged such that its opening 9 faces the heliostat field, so that an optimum of rays will reach the interior space. The solar receiver 4 does not have to be strictly cylindrical. An expansion towards the opening 9 or, on the contrary, a tapering, is also conceivable. The walls defining the interior space also do not have to be straight, when viewed in an axial section according to FIG. 4. A bell-shaped or funnel-shaped configuration is conceivable.

The hollow body is open at its front-side end. See opening 9. Ducts 10 can be seen at its other front-side end. These ducts are in conductive connection with the inner annular space 8.2.1. The partial flows of air being discharged herein are collected in an outlet 11, provided with a valve Vo.

Further, an inlet 12, provided with a valve Vi, can be seen in FIGS. 3 and 4. This inlet is located in an end area, which is located opposite the opening 9. The inlet 12 is brought tangentially into contact with the wall 8. The inlet 12 feeds compressed air to the hollow body, for example, from the surrounding area or from a compressor, and it is shown in FIG. 1. The air is fed into the outer annular space 8.1.1.

The flow path of the air is as follows:
After the entry of the air into the outer annular space 8.1.1, the air flows farther in the direction of the longitudinal axis up to the end of the hollow body at which the opening 9 is located. The air stream is deflected there by 180°. After this turning point, the air flows in the opposite direction through the inner annular space 8.2.1, again parallel to the longitudinal axis 8.4 in the direction of the outlet 11.

This reverse flow principle has considerable advantages: The initially still relatively cold medium, which enters into the tangential inlet 12, flows through the outer annular space 8.1.1. Even though the medium is warmed up on its path from the inlet 12 to the area of the opening 9, it still remains at a relatively low temperature level. This is important for the case in which not only a single solar receiver is used, but a plurality of solar receivers, which are in physical contact with one another, e.g., in the manner of honeycombs. If there were no outer annular space 8.1.1 in the individual solar receivers 4, unacceptably high temperatures, which can lead to destruction, would be generated in the entire cluster of solar receivers.

The outer wall 8.1 according to the present invention carries out the following functions:
 It withstands considerable pressures.
 It acts as an insulation and prevents an excessive heating of the outer wall.
 It captures heat, which can be utilized.

As is seen from the further figures, there are built-in components 13 in the inner annular space 8.2.1. These are elements that are used to guide the air and/or to swirl the air (turbulence generation). The elements 13 may have different shapes and arrangements. The elements 13 form a sawtooth profile together in this case. These shall be strands consisting of any material, for example, metal, which have a triangular cross section. The apex of the triangle is in contact with the partition wall 8.3, and one side of each triangle is in contact with a surface of the inner partition wall. A reverse arrangement, in which the apex of each triangle is in contact with the inner wall, is conceivable as well.

In an especially remarkable embodiment, each strand runs helically in the triangular embodiment of the elements 13 shown, i.e., starting from the area of the opening 9 of the hollow container to its end.

In case of a helical arrangement of the elements shown, the individual strand is in contact with the inner wall 8.2 as well as with the partition wall 8.3.

The elements 13 may also have an entirely different configuration. It is thus conceivable that lamellae, which protrude into the inner annular space 8.2.1, are provided instead of a triangular cross section. Nubs or pins may be provided as well. In any case, it must, of course, be ensured that air can flow fully and completely through the inner annular space 8.2.1, i.e., from the area of the opening 9 of the hollow body to the end area, which is located opposite the opening 9.

The partition wall 8.3 is, in general, insulated against heat transfer.

Figure 5:
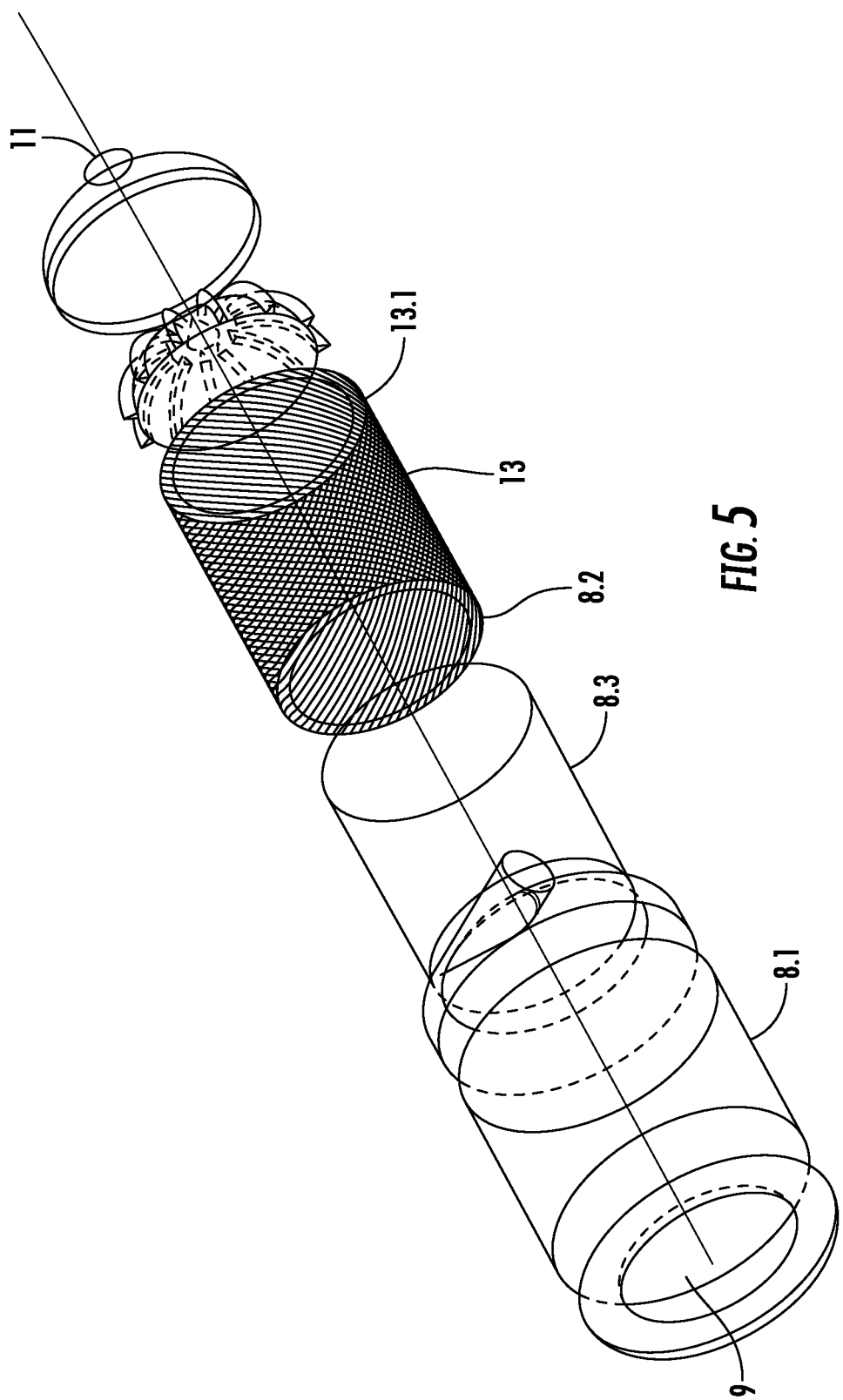
FIG. 5 is a view of the solar receiver of FIG. 3 in an unmounted state.
Figure 6:
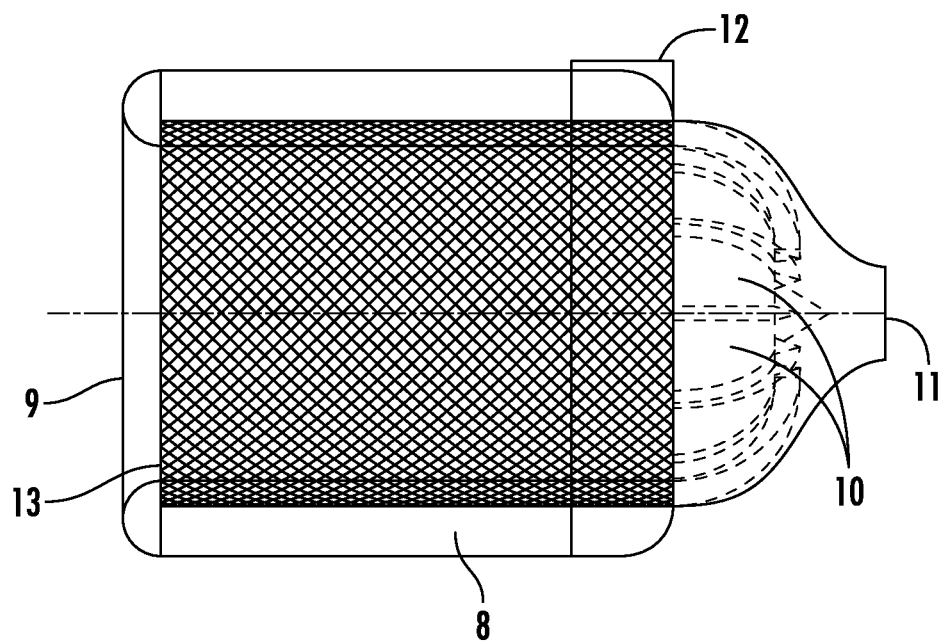
FIG. 6 is a view of the solar receiver of FIG. 5 in a mounted state.
Figure 7:
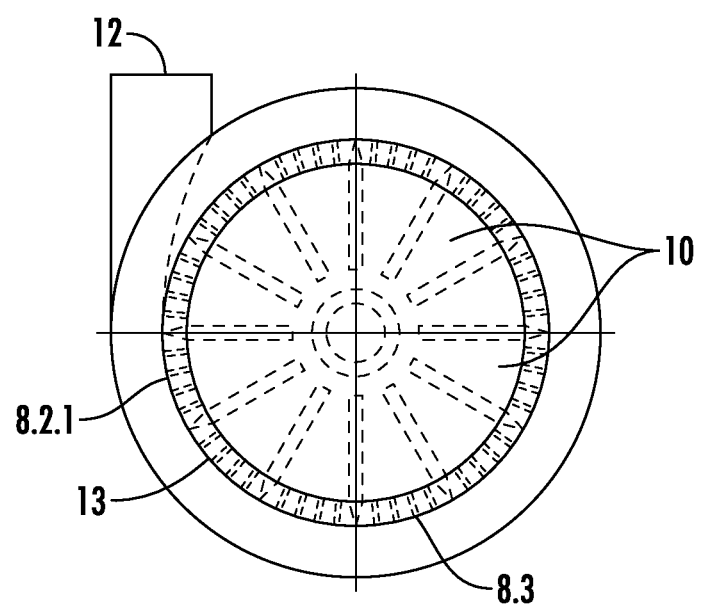
FIG. 7 is a top view of the end area of the solar receiver of FIG. 6.
Figure 8:
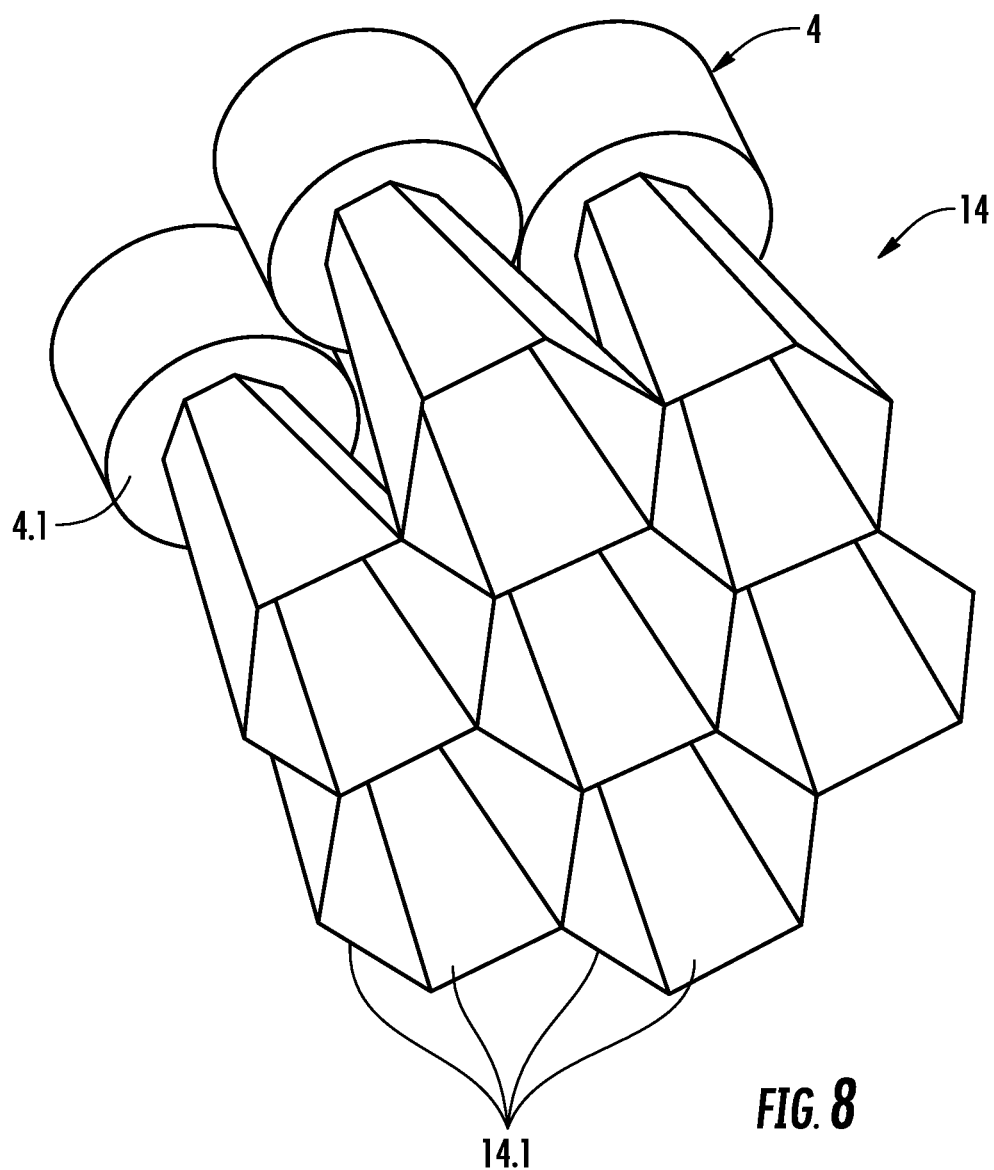
FIG. 8 is a schematic view of an expanded solar receiver with secondary concentrators in a 3D view.

FIGS. 5 through 7 show an impression of the shape and appearance of the elements 13. See a hollow cylinder 13.1 in FIGS. 5 and 6. The hollow cylinder 13.1 is fitted together from an interlacing array of many elements 13. FIG. 5 shows, for example, the cylindrical outer wall 8.1 in phantom lines. The partition wall 8.3 can be pushed into this outer wall, and the hollow cylinder 13.1 can, in turn, be pushed into this partition wall. The inner wall 8.2 must still be pushed into the hollow cylinder 13.1, but this is not shown here. FIG. 8 is an especially remarkable configuration. A cluster of solar receivers 4 is shown here. These are arranged concentrically in relation to one another.

A secondary concentrator 14 is arranged upstream of each solar receiver. The number of secondary concentrators 14 provided is thus equal to the number of solar receivers.

Each secondary concentrator is configured as follows: It has the shape of a funnel, which expands downward starting from the lower end. Its upper, tapered end is passed through the opening 9 of each solar receiver 4 and may protrude more or less far into the interior space of the solar receiver. However, it may also start at the opening 9. As is seen, the opening 9 is dimensioned and configured such that it is defined by a collar 4.1, which is ring-shaped and whose outer circumferential edge adjoins the outer wall 8.1 of the solar receiver 4, optionally in a sealing manner, while the inner circumference likewise adjoins sealingly the secondary concentrator in question.

Each secondary concentrator has a hexagonal cross section in this case. This means that the outer surfaces of mutually adjacent secondary concentrators are snugly in contact with each other (honeycomb shape).

The same configuration may also be provided in the solar receivers, i.e., also a hexagonal cross section, unlike in the embodiment shown, in which the outer walls 8.1 have a circular cross section.

The secondary concentrators are configured from bodies that consist of highly reflective material on the inside. The inner surfaces are thus mirror surfaces 14.1. The outer surfaces are, by contrast, preferably cooled.

There are a plurality of heat sources in the entire plant, which are not used directly for the process, but they are used indirectly. These include the heat that is generated on the outer surfaces of the secondary concentrators. Another heat source is located at the outer wall 8.1 of the wall 8. All these quantities of heat are preferably captured and fed to a heat exchange process and are thus utilized.

While specific embodiments of the invention have been shown and described in detail to illustrate the application of the principles of the invention, it will be understood that the invention may be embodied otherwise without departing from such principles.

The invention claimed is:

1. A solar receiver for receiving solar rays, which heat a free-flowing medium, the solar receiver comprising:
 a hollow body having a longitudinal axis, the hollow body comprising a wall enclosing a longitudinal length region within the hollow body, an opening located in the wall for entry of heat rays and an end area located opposite the opening, the wall comprising an outer wall, an inner wall and a partition wall located between the inner wall and the outer wall, the outer wall and the partition wall enclosing an outer annular space, and the inner wall and the partition wall enclosing an inner annular space, the outer annular space having an inlet in the end area for free-flowing medium, the outer annular space and the inner annular space being in conductive connection with one another in the area of the opening, the inner annular space having an outlet for free-flowing medium in the end area;
 fluid-carrying and/or turbulence-generating elements configured to and arranged in the inner annular space, the fluid-carrying and/or turbulence-generating elements comprising projections and/or beads cooperating with at least one of the partition wall and the inner wall to define a helical duct, the helical duct being formed by the fluid carrying elements;
 an inlet valve at the inlet of the outer annular space in the end area for free-flowing medium; and
 an outlet valve at the outlet of the inner annular space for free-flowing medium in the end area.

2. A solar receiver in accordance with claim 1, wherein the fluid-carrying elements form at least one sawtooth profile.

3. A solar receiver in accordance with claim 1, wherein the outer wall has a hexagonal shape when viewed in a cross section at right angles to the longitudinal axis.

4. A solar receiver in accordance with claim 1, in combination with a secondary concentrator, wherein the secondary concentrator is arranged upstream of the solar receiver.

5. A solar receiver in accordance with claim 4, wherein:
the secondary concentrator is funnel-shaped;
a tapering end of the secondary concentrator is adjoined in an area of the opening to the hollow body;
an inner surface of the secondary concentrator is formed from a reflecting material; and
an outer surface of the entire secondary concentrator or of individual mirror elements forming the entire secondary concentrator are provided with a cooling device.

6. A solar receiver in accordance with claim 2, wherein the outer wall has a hexagonal shape when viewed in a cross section at right angles to the longitudinal axis.

7. A solar receiver in accordance with claim 2, in combination with a secondary concentrator, wherein the secondary concentrator is arranged upstream of the solar receiver.

8. A solar receiver in accordance with claim 3, in combination with a secondary concentrator, wherein the secondary concentrator is arranged upstream of the solar receiver.

9. A solar receiver for receiving solar rays, which heat a free-flowing medium, the solar receiver comprising:
a hollow body having a longitudinal axis, the hollow body having a wall enclosing a longitudinal length region within the hollow body, the hollow body comprising an opening located in the wall for entry of heat rays and an end area located opposite the opening, the wall comprising an outer wall, an inner wall and a partition wall located between the inner wall and the outer wall, the outer wall and the partition wall enclosing an outer annular space, and the inner wall and the partition wall enclosing an inner annular space, the outer annular space having an inlet in the end area for free-flowing medium, the outer annular space and the inner annular space being in conductive connection with one another in the area of the opening, the inner annular space having an outlet for free-flowing medium in the end area;
fluid-carrying and/or turbulence-generating elements comprising strands of triangular cross section with an apex of the triangular cross section in contact with one of the partition wall and the inner wall and a side of each triangle of the triangular cross section in contact with a surface of another of the partition wall and the inner wall, the strands being configured to run helically and arranged in the inner annular space, starting from the area of the opening of the hollow container to or adjacent to the end area, wherein a helical duct configuration is formed by the fluid carrying elements;
an inlet valve at the inlet of the outer annular space in the end area for free-flowing medium; and
an outlet valve at the outlet of the inner annular space for free-flowing medium in the end area.

\* \* \* \* \*